United States Patent
Lämmerhirt et al.

(10) Patent No.: US 12,229,863 B2
(45) Date of Patent: Feb. 18, 2025

(54) COMPUTER IMPLEMENTED METHOD AND PROGRAMMABLE SYSTEM FOR RENDERING A 2D/3D MODEL

(71) Applicant: GRITWORLD GMBH, Frankfurt Am Main (DE)

(72) Inventors: Christoph Lämmerhirt, Frankfurt Am Main (DE); Pascal Artus, Frankfurt Am Main (DE)

(73) Assignee: GritWorld GmbH, Frankfurt Am Main (DE)

( * ) Notice: Subject to any disclaimer, the term of this patent is extended or adjusted under 35 U.S.C. 154(b) by 0 days.

(21) Appl. No.: 17/620,335

(22) PCT Filed: Jun. 19, 2020

(86) PCT No.: PCT/EP2020/067126
§ 371 (c)(1),
(2) Date: Dec. 17, 2021

(87) PCT Pub. No.: WO2020/254593
PCT Pub. Date: Dec. 24, 2020

(65) Prior Publication Data
US 2022/0319092 A1 Oct. 6, 2022

(30) Foreign Application Priority Data
Jun. 20, 2019 (DE) .................. 102019116715.9

(51) Int. Cl.
*G06T 15/00* (2011.01)
*G06T 1/60* (2006.01)
(Continued)

(52) U.S. Cl.
CPC .............. *G06T 15/005* (2013.01); *G06T 1/60* (2013.01); *G06T 11/00* (2013.01); *G06T 15/04* (2013.01); *G06T 15/60* (2013.01); *G06T 2215/12* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

2009/0040222 A1* 2/2009 Green ................. G06T 15/50
345/426
2013/0063472 A1 3/2013 Marison et al.
(Continued)

FOREIGN PATENT DOCUMENTS

| JP | 2001184500 A | 7/2001 |
|---|---|---|
| JP | 2003271986 A | 9/2003 |
| JP | 2017123034 A | 7/2017 |

OTHER PUBLICATIONS

Rieder, Christian, et al. "A Shader Framework for Rapid Prototyping of GPU-Based Volume Rendering. In: Computer Graphics Forum". Oxford, UK: Blackwell Publishing Ltd, 2011. pp. 1031-1040.
(Continued)

*Primary Examiner* — Gordon G Liu
(74) *Attorney, Agent, or Firm* — Harness, Dickey & Pierce, P.L.C.

(57) ABSTRACT

The invention relates to a computer implemented method for rendering a 2D/3D model. The method comprises the step of providing a memory unit and a first effect unit, the memory unit configured to store data regarding the model and send the data into at least the first effect unit, the first effect unit configured to receive the sent data, render the model based on the received data and generate a first rendering result;
(Continued)

Figure 1:
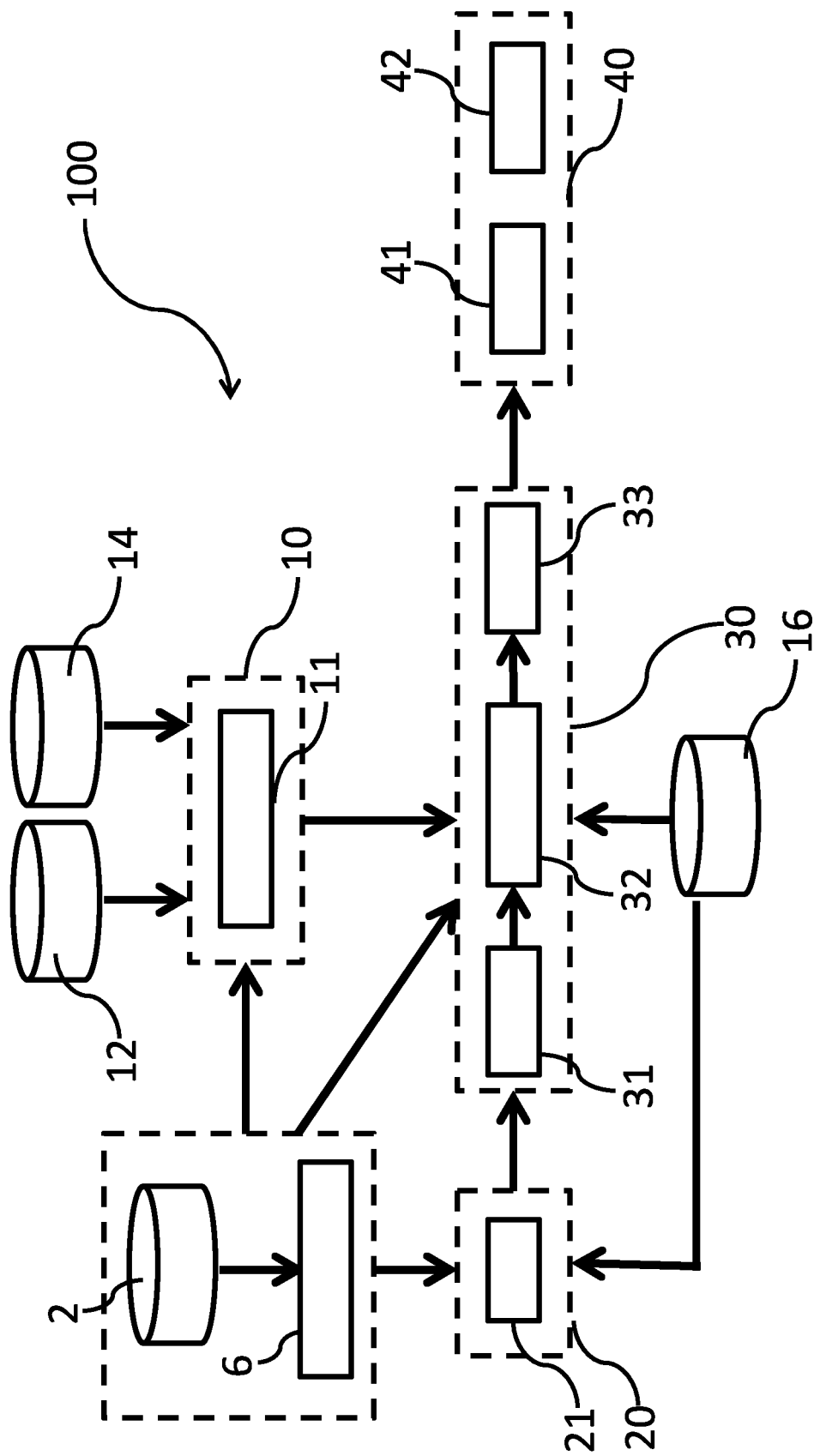

generating a second effect unit for performing a rendering process; arranging the second effect unit such that the second effect unit is configured to receive at least one of the first rendering result and the data from the memory unit; detecting a change of the data stored in the memory unit; and rendering, by the first and second effect units, the 2D/3D model.

7 Claims, 2 Drawing Sheets

(51) Int. Cl.
  *G06T 11/00* (2006.01)
  *G06T 15/04* (2011.01)
  *G06T 15/60* (2006.01)
(58) Field of Classification Search
  USPC .......................................................... 345/419
  See application file for complete search history.

(56) References Cited

U.S. PATENT DOCUMENTS

2016/0358307 A1  12/2016  Brothers et al.
2017/0287198 A1*  10/2017  Feng ..................... G06T 17/005
2019/0180499 A1*  6/2019  Caulfield ................. G06T 1/20

OTHER PUBLICATIONS

Kekoa Proudfoot et al, "A real-time procedural shading system for programmable graphics hardware", Computer Graphics. SIGGRAPH 2001. Conference Proceedings. Los Angeles, CA, Aug. 12-17, 2001; [Computer Graphics Proceedings. SIGGRAPH], New York, NY: ACM, US, Aug. 12, 2001 (Aug. 12, 2001), pp. 159-170.

Trujillo Agustin et al, "An Efficient Architecture for Automatic Shaders Management on Virtual Globes", 2014 Fifth International Conference On Computing for Geospatial Research and Application, IEEE, Aug. 4, 2014 (Aug. 4, 2014), pp. 38-42.

Anonymous: "Graphics pipeline—Wikipedia", Mar. 29, 2019 (Mar. 29, 2019), pp. 1-6, XP55726005, Retrieved from the Internet: URL:https://en.wikipedia.org/w/index.php?title=Graphics_pipeline &oldi d=890038047 [retrieved on Aug. 29, 2020] the whole document.

International Search Report and Written Opinion of the ISA issued in PCT/EP2020/067126, mailed Sep. 15, 2020; ISA/EP, 15 pages.

Russian Office Action from counterpart RU2022101122, dated Nov. 7, 2023.

Second Japanese Office Action regarding Patent Application No. 2021-575420, dated Feb. 6, 2024.

* cited by examiner

COMPUTER IMPLEMENTED METHOD AND PROGRAMMABLE SYSTEM FOR RENDERING A 2D/3D MODEL

CROSS-REFERENCE TO RELATED APPLICATIONS

This application is a 371 U.S. National Phase of International Application No. PCT/EP2020/067126 filed on Jun. 19, 2020, which claims priority to German Application No. 10 2019 116 715.9 filed on Jun. 20, 2019. The entire disclosures of the above applications are incorporated herein by reference.

The invention relates to a computer implemented method for rendering a 2D/3D model, a programmable system for rendering a 2D/3D model, a computer program comprising instructions which cause the computer to carry out the method for rendering a 2D/3D model.

In computer vision and computer graphics, 3D reconstructions realize reproductions of the shape and appearance of real objects. In order to achieve this purpose, digital three dimensional (3D) models of the real objects are created. Two dimensional (2D) geometric models are also convenient for describing certain types of artificial images, such as technical diagrams, logos, the glyphs of a font, etc. They are an essential tool of 2D computer graphics and often used as components of 3D geometric models.

Rendering is the automatic process of generating a photorealistic or non-photorealistic image from a 2D or 3D model by means of computer programs. These computer programs for rendering are often called "renderers" or "render engines" and define rendering effects which as a whole form a so-called "render pipeline". A render pipeline defines the order in which the effects are to be executed for rendering the final image. Each effect is defined by a set of "shaders" (in the form of small programs) that can be executed on the GPU in the form of a "pass" which may contain a list of render state setup commands.

Such a render pipeline may become very large and complicated to be managed. One of the reasons is that it may grow up to dozens of passes where many of those need to be reconfigured, exchanged or completely removed. This may occur statically at compile time if different hardware is being targeted or dynamically during runtime if quality settings have been changed.

In addition, it is always beneficial to improve the development process for a render pipeline.

Some commercially available real-time render engines such as Unity only support static render pipelines which offer a certain degree of freedom by providing entry points into the render pipelines. With such an entry point, a user can add his own specific effects and/or passes to the pipelines where the engine developers allow this. Furthermore, the data which are allowed to be accessed by the user at the entry points are also limited. Moreover, the user is only allowed to use a subset of the available GPU features because of the high level of abstraction provided by those engines.

Thus, the invention is based on the object of providing a flexible design for the rendering and improving the development process for a render pipeline.

The invention provides, according to the first aspect, a computer implemented method for rendering a 2D/3D model. The method comprises the step of providing a memory unit and a first effect unit, the memory unit configured to store data regarding the model and send the data into at least the first effect unit, the first effect unit configured to receive the sent data, render the model based on the received data and generate a first rendering result; generating a second effect unit for performing a rendering process; arranging the second effect unit such that either the second effect unit is configured to receive the first rendering result, or the second effect unit is configured to receive the data from the memory unit; detecting a change of the data stored in the memory unit; and rendering, by the first and second effect units, the 2D/3D model.

It is particularly advantageous that the inventive method enables a user to freely and easily add (effect) units to the existing pipeline, such as adding the second effect unit to the existing pipeline comprising the first effect unit and the memory unit. Thus, a user can flexibly design the rendering process or the render pipeline, without being limited to use only a subset of shaders provided by a render engine, have only the access to the entry points of a render engine provided by the developer of the render engine and have only access to certain data/data types at the entry points defined by the developer of the render engine.

For instance, inventively, a user may generate and program the second effect unit in order to implement a new shadow mapping algorithm to achieve rendering of shadows.

It is further advantageous that when a user constantly amends the input data during a rendering process e.g. in order to compare the rendering results, with the help of automatically detecting the changes of the data, the development process of a rendering system is improved.

In a preferable embodiment, when the second effect unit is configured to receive the first rendering result, the method further comprises the step, performed by the second effect unit, of either generating a second rendering result based on the received first rendering result, or generating a third rendering result based on the received first rendering result and the data regarding the model from the memory unit.

If the first alternative of said step is performed, the output of the first effect unit is used as the only input of the second effect unit. If the second alternative of said step is performed, not only the output of the first effect unit, but also the data stored in the memory unit are used as the input of the second effect unit for inputting different data containing different specific parameters into the second effect unit.

In another preferable embodiment, when the second effect unit is configured to receive the data from the memory unit, the method further comprises the step, performed by the second effect unit, of generating a fourth rendering result based on the received data from the memory unit.

In this embodiment, the data stored in the memory unit may be inputted into the first and second effect units, respectively, in order to produce different rendering effects which may be then used separately as inputs to several other effect units and/or jointly as inputs to another effect unit.

In another preferable embodiment, the method further comprises the steps of transforming, in particular batching and/or instancing, the data regarding the model stored in the memory unit; and sending the transformed data into the first and/or second effect unit.

It is favorable that the data stored in the memory unit are transformed and/or generally edited before sending them to an effect unit such that the user may not need to consider the rearrangement of the data e.g. from a scene file, but concentrate on the development of the rendering system.

Preferably, data from e.g. a scene file are inventively batched in order to be arranged in sets or groups. Data such as geometry data may also, or alternatively, be instanced for rendering multiple copies of the same mesh (which is a collection of vertices and faces that defines the shape of a polyhedral object in 3D computer graphics) in a scene at once.

In another preferable embodiment, the method further comprises the step of removing the second effect unit, wherein the generation or removing of the second effect unit is carried out during the rendering of the model by the first and/or second effect unit. Thereby, the development process is further simplified.

In another preferable embodiment, the method further comprises the step of providing connecting elements for connecting the second effect unit with the first effect unit and/or memory unit, in particular during the rendering of the model by the first effect unit, wherein the first and second effect units as well as the memory unit are connected as a directed acyclic graph which is a graph that directly connects the units without any cycles.

Thereby, a fully working render pipeline can be inventively created, the topology thereof changes dynamically, and a flexible design for a render engine is realized.

In another preferable embodiment, the first effect unit and second effect unit comprise at least a shader subunit, respectively, which is generated from at least a shader file which is in particular stored in the memory unit, and wherein the shader subunit is automatically updated during the rendering of the model by the first and/or second effect unit, if the shader file is modified.

A shader file contains shader code that can be specialized during runtime. Depending on the changed input data stored in the memory unit, at least one corresponding code path in the shader file can be automatically selected for generating a new specialized shader during the runtime. This further improves the development process.

The invention further provides, according to a second aspect, a programmable system for rendering a 2D/3D model comprising a memory unit, a first effect unit and a second effect unit, the memory unit configured to store data regarding the model and send the data into at least the first effect unit, the first input unit configured to receive the sent data, render the model based on the received data and generate a first rendering result, the second effect unit configured to receive one of the first rendering result and the data from the memory unit. The first and second effect units are configured to detect a change of the data stored in the memory unit and to render the 2D/3D model.

The invention further provides, according to a third aspect, a computer program comprising instructions which, when the program is executed by a computer, cause the computer to carry out the method according to the first aspect.

Any computer language may be used to write the code for the inventive units as well as the other elements of the rendering system.

The invention further provides, according to a fourth aspect, a computer-readable medium comprising instructions which, when executed by a computer, cause the computer to carry out the method according to the first aspect.

Figure 2:
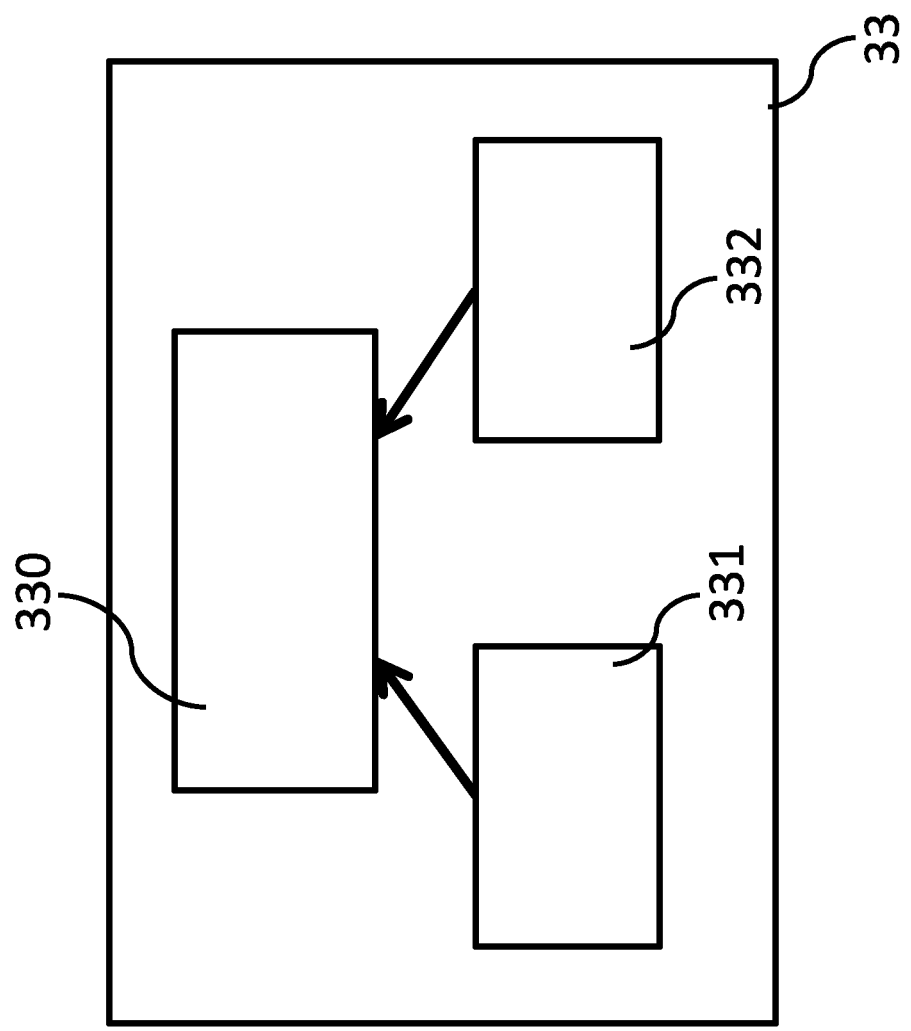

Further advantageous details and features may be taken from the following description of an exemplary embodiment of the invention in conjunction with the drawings, in which FIG. 1 shows a schematic illustration of an embodiment of the inventive programmable system for rendering a 2D/3D model; and FIG. 2 shows a schematic illustration of the generation of new pass instances/shaders according to the embodiment shown in FIG. 1.

According to FIG. 1, the embodiment of the inventive programmable system 100 for rendering a 2D/3D model comprises five effect units 6, 10, 20, 30, 40 and four memory units 2, 12, 14, 16. The effect unit 6 is for transforming the data stored in the memory unit 2 or generally editing them for adaption to the system.

Data from a scene file stored in the memory unit 2 may comprise scene geometry and are inputted into the effect unit 6. In the shown embodiment, the inputted data regarding meshes are batched by the effect unit 6 in order to be arranged in groups.

The batched data are transferred to the effect unit 20 which is a render depth effect unit and e.g. renders the geometry without writing colors in the framebuffer. The render depth effect unit 20 comprises a render depth subunit 21 for executing the pre depth effect unit 20.

Some additional render parameters regarding cameras are stored in the memory unit 16 and inputted into the render depth effect unit 20 and into the forward plus unit 30 which computers lighting and render graphics.

The batched data are also inputted into the shadow mapping effect unit 10 which allows adding shadows to 3D computer graphics. Various light parameters stored in the memory units 12, 14 are inputted into the shadow mapping effect unit 10, respectively. The shadow mapping effect unit 10 comprises a shadow mapping subunit 11 for executing the shadow mapping effect unit 10.

The rendering results of the render depth effect unit 20 and the shadow mapping effect unit 10 as well as the batched data are inputted into the forward plus unit 30 as well. The forward plus unit 30 comprises a culling subunit 31 which culls the related geometric objects to reduce the number of lights that must be considered during shading, a light binning subunit 32 for sorting the lights and a shading subunit 33 which iterates over a list of lights in the scene to determine how the geometric objects should be lit.

The rendering result of the forward plus effect unit 30 is transferred to the post processing effect unit 40 which allows effects to be used that require awareness of the entire image since normally each 3D object is rendered in isolation. The post processing unit 40 comprises in the shown embodiment two post processing subunits 41, 42 for executing the post processing unit 40.

Afterwards, the rendering result of the post processing unit 40 may be transferred to another effect unit (not shown) or stored for further use.

Taken as an example the shading subunit 33 of the forward plus effect unit 30 (see FIG. 2), it is generated from a shader file containing shader code 330 that can be specialized during runtime. Depending on the changed input data, corresponding code paths from the shader code 330 can be automatically selected for generating new pass instances/shaders 331, 332 during the runtime. This further improves the development process.

With the help of the shown inventive programmable system 100, a flexible design for the rendering of 2D/3D models and a simple change of the render pipeline are achieved.

The invention is described and illustrated in detail by the preferable embodiments mentioned above. However, the invention is not limited by the disclosed examples, and other variations can be derived therefrom while still being inside the protection scope of the invention.

The invention claimed is:
1. A computer implemented method for rendering a 2D/3D model, comprising the steps of providing a memory unit and a first effect unit, the
memory unit configured to store data regarding the
model and send the data into at least the first effect unit,
the first effect unit configured to receive the sent data,
transform the sent data into batched data, render the
model based on the received data and generate a first
rendering result;
generating a shadow mapping effect unit;
receiving, by the shadow mapping effect unit, the batched
data from the first effect unit and generating, by the
shadow mapping effect unit, a further rendering result;
generating a second effect unit for performing a rendering
process;
arranging the second effect unit such that the second effect
unit is configured to receive the first rendering result
directly from the first effect unit, and to receive the
further rendering result from the shadow mapping
effect;
detecting a change of the data stored in the memory unit;
and
rendering, by the first effect unit, the shadow mapping
effect unit and the second effect unit, the 2D/3D model.

2. The method according to claim 1, when the second effect unit is configured to receive the first rendering result, comprising further the step, performed by the second effect unit, of
generating a second rendering result based on the received first rendering result.

3. The method according to claim 1, comprising further the step of
removing the second effect unit, wherein the generation or removing of the second effect unit is carried out during the rendering of the model by the first and/or second effect unit.

4. The method according to claim 1, comprising the step of providing connecting elements for connecting the second effect unit with the first effect unit and/or the memory unit, in particular during the rendering of the model by the first effect unit, wherein the first and second effect units as well as the memory unit are connected as a directed acyclic graph.

5. The method according to claim 1, wherein the first effect unit and second effect unit comprise at least a shader subunit, respectively, which is generated from at least a shader file which is in particular stored in the memory unit, and wherein the shader subunit is automatically updated during the rendering of the model by the first and/or second effect unit, if the shader file is modified.

6. Non-transitory computer-readable medium comprising instructions which, when executed by a computer, cause the computer to carry out the method of claim 1.

7. A programmable system for rendering a 2D/3D model comprising a memory unit, a first effect unit, a shadow mapping effect unit, and a second effect unit,
the memory unit configured to store data regarding the model and send the data into at least the first effect unit,
the first effect unit configured to receive the sent data, transform the sent data into batched data, render the model based on the received data and generate a first rendering result,
the shadow mapping effect unit configured to receive the batched data from the first effect unit and generate a further rendering result;
the second effect unit configured to receive at least one of the first rendering result directly from the first effect unit and the data from the memory unit;
wherein the first and second effect units are configured to detect a change of the data stored in the memory unit and to render the 2D/3D model.

* * * * *